United States Patent [19]

Konrad

[11] 4,028,781

[45] June 14, 1977

[54] SURFACING TOOL

[76] Inventor: Joseph D. Konrad, 6340 Stumph Road, Apt. 311-B, Parma Heights, Ohio 44130

[22] Filed: July 21, 1976

[21] Appl. No.: 707,366

[52] U.S. Cl. .................................. 29/78; 76/101 SM
[51] Int. Cl.² ................... B23D 71/00; B21K 21/00
[58] Field of Search .............. 76/101 SM; 29/78, 79

[56] References Cited

UNITED STATES PATENTS

| | | | |
|---|---|---|---|
| 2,820,281 | 1/1958 | Amsen | 29/78 |
| 3,509,611 | 5/1970 | Kifer | 29/78 |
| 3,583,107 | 6/1971 | Benis | 76/101 SM |

FOREIGN PATENTS OR APPLICATIONS

| | | | |
|---|---|---|---|
| 584,480 | 10/1959 | Canada | 76/101 SM |
| 695,821 | 8/1953 | United Kingdom | 29/78 |

*Primary Examiner*—Harrison L. Hinson
*Attorney, Agent, or Firm*—Bosworth, Sessions & McCoy

[57] ABSTRACT

A perforated abrasive metal sheet is adapted for use instead of sandpaper in a reciprocating sander.

10 Claims, 2 Drawing Figures

SURFACING TOOL

BACKGROUND OF THE INVENTION

This invention consists of a unique surfacing tool, more specifically a perforated abrasive metal sheet adapted for use instead of sandpaper in commercial sanding machines with reciprocating sanding action.

The problem of smoothing wood surfaces, painted and unpainted, is an age old one. Techniques for accomplishing this include planing, scraping, filing and sanding. Planing and scraping generally require unidirectional movement while filing and sanding are usually not so limited. Converting these techniques from hand power to motor power has resulted in some modifications. Motor power has provided two styles of action for abrading tools. One is a substantially lineal action which operates in one direction as in a belt sander or in two directions as in a reciprocating sander. The other is a rotary action as in a rotary disc sander. It is noteworthy that in the field of motor-powered hand tools for smoothing wood surfaces sanders are well known whereas motor-powered hand-held planes, scrapers and files are uncommon or unknown. Sanders other than belt sanders make use of sandpaper which is supported on some sort of base. While sandpaper is generally inexpensive, its use with motor-powered tools presents a problem in that some of the sand is released from the paper and most of the rest of the sandy surface becomes clogged with the large amounts of wood flour generated by motorized sanding. The problem of wood flour buildup is partially alleviated in belt sanders by the flexing action on the sandpaper belt coupled with the centrifugal force on the wood flour as the belt turns in its continuous, generally elliptical path and in disc sanders by the centrifugal force on the wood flour from the rotating sandpaper disc. The solutions to these problems have been the subject of a number of patents.

U.S. Pat. No. 932,879 discloses a sandpapering plane with a special provision for clamping sandpaper thereon.

U.S. Pat. No. 1,729,881 discloses a rotary disc file which is a hardened steel disc with a large number of burrs or cutting teeth. The disc is fastened to and supported at its center and around its edge by a back plate. The disc is supported at its center and around its edge and is otherwise self-supporting.

U.S. Pat. No. 1,789,298 discloses a cylindrical abrading roll formed from a spirally-wound thin metal strip provided with rows of abrading teeth produced by perforating the strip by means of punches whereby the projections or burrs surrounding the perforations form the teeth. The strip is supported by a core having a plurality of supporting spiral ribs. It should be noted that this device is designed to remove surplus material, such as leather from shoe parts, while roughening rather than smoothing the final surface.

U.S. Pat. No. 2,518,448 discloses an endless band abrading device like a belt sander but featuring an endless steel band provided with a series of outwardly directed teeth formed by being struck up from the material of the band.

U.S. Pat. No. 2,703,119 discloses an annular scraping disc having a plurality of raised perforations punched outwardly therein, the size of the perforations decreasing towards the center of the disc.

None of this art discloses a surfacing tool for use with a reciprocating motor drive.

SUMMARY OF THE INVENTION

This invention is a rectangular metal sheet, preferably steel, ranging in thickness from about 0.008, preferably 0.01, to about 0.02 inch and having opposed end portions, each of said end portions having means for attachment to a reciprocating motor-powered drive means, the preferred attachment means being simple tabs or flanges suitable for clamping to the drive means. The metal sheet is perforated with punched holes whereby the burrs from punching form an abrasive surface. The total area of the punched holes or perforations must be no greater than the total area of the remaining non-perforated metal, preferably no greater than one-half the total area of non-perforated metal, and the distance between the edge of any given perforation and any other edges such as its nearest perforations or the edge of the metal sheet is no less than about 0.75 times the smallest lateral dimension, e.g. diameter, of the smaller of the two perforations nor more than about four times the minimum lateral dimension of the larger of the two perforations. The minimum lateral dimension of any perforation is about 0.03 inch, and the maximum lateral dimension of any perforation is about 0.16 inch. Preferably, these lateral dimensions range from about 0.06 to about 0.10 inch. Preferably, the length of each of the burrs surrounding said perforations also is in the range of from about 0.03 to about 0.13 inch, more preferably from about 0.06 to about 0.10 inch. Preferably, all the perforations are substantially the same size, and the areas of said perforations range from about 0.0007 to about 0.02 square inch. The perforations can be in a random or ordered pattern.

DESCRIPTION OF THE PREFERRED EMBODIMENT

Figure 1:
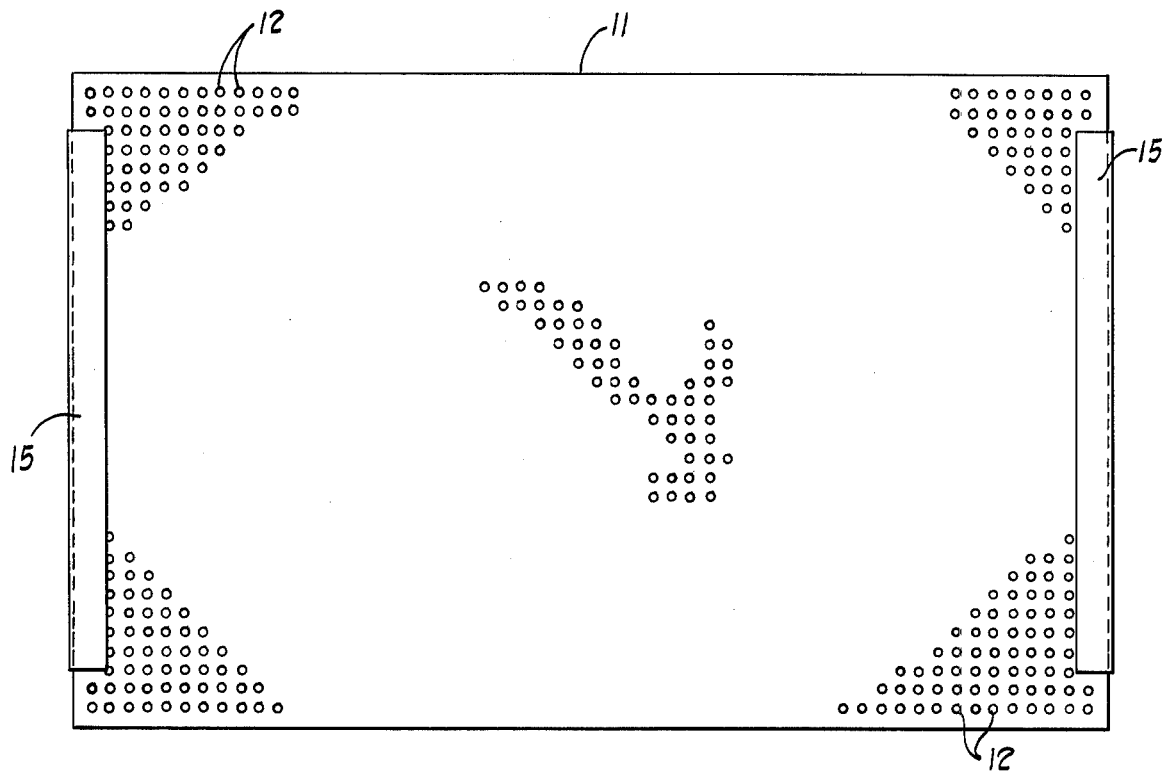
FIG. 1 is a top plan view of the perforated metal sheet of this invention.
Figure 2:
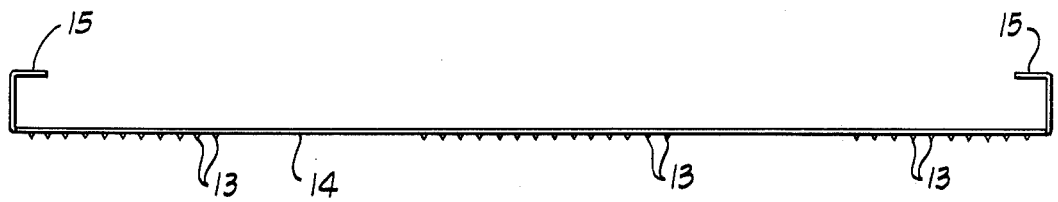
FIG. 2 is a side elevation of the perforated metal sheet of this invention.

In FIGS. 1 and 2 of the drawing a 0.15 inch thick rectangular metal sheet 11, preferbly steel and more preferably stainless steel, is perforated with holes 12 which have been punched in said sheet to make burrs 13 which collectively form an abrasive surface on the bottom 14 of the metal sheet 11. At each end of the metal sheet a metal tab or flange 15 has been formed to be secured by a clamp or other holding means to a motor-powered reciprocating drive means (not shown) such as a reciprocating or vibrating sander wherein the abrasive metal sheet 11 replaces the usual sandpaper. The flanges appear to be more easily clamped if they are also perforated although the style of perforation is not so critical. Alternatively, the flanges can be thickened by the use of additional metal or by folding an extended flange 15 on itself to make clamping more positive. The flanges 15 can be as wide or even wider than perforated portion of sheet 11. The pattern of the perforations is rectangular or square but appears to be unimportant, the most compact arrangement for circular perforations being on axes 60° from each other.

In this preferred embodiment circular perforations of 0.078 inch diameter have been punched in a rectangular pattern spaced 0.14 inch from center to center with no perforation edges closer than 0.10 inch to the edge of the sheet. The major burrs are about 0.062 inch long. The area of each perforation is 0.0048 square inch. The total area of the 1860 perforations is about 8.9 square inches in a perforated surface 9 inches long and 4.5 inches wide or 40.5 square inches. Thus, th total area of the perforations is 28.2 percent based on the remaining metal surface. Where the total area of perforations is less than 50 percent based on the remaining metal surface, particularly when the axis of said perforations are in lines 60° from each other, the metal appears to resist distortion in not stretching and in remaining flatter thereby giving better results with smoother vibration.

If 0.078 inch diameter perforations are punched in the same size sheet in rows having 60° axes with 0.031 inch between edges, there are 3753 perforations having a total area of about 18 square inches which equals 80 percent total perforation area based on the remaining metal surface. If 0.156 inch diameter perforations are punched in the same size sheet in rows having 60° axes with 0.094 inch between edges, there are 660 perforations having a total area of 12.65 square inches which equals about 46 percent total perforation area based on the remaining metal surface.

The thickness of the metal sheet is critical. If it is less than about 0.008 inch, the sheet will tear during use notwithstanding maximum space between perforations as defined above. If the metal thickness is greater than about 0.02 inch, the burrs 13 formed by punching the holes 12 are unsatisfactory for the motor-powered surfacing of wood.

When the perforations are too small, there is difficulty in efficient removal of the shredded and/or ground wood. When the burrs are too small, there is insufficient abrasive action. When the perforations or the burrs are too large, control of the motor-driven unit and achievement of an optimally smoothed surface is substantially more difficult.

The shape of each perforation is not critical and can be circular, elliptical or polygonal.

I claim:

1. A surfacing tool consisting essentially of a rectangular metal sheet ranging in thickness from about 0.008 to about 0.02 inch having a flat central portion and opposed end portions,
   said flat central portion being perforated with holes all punched in the same direction in said portion, each hole having a minimum lateral dimension of about 0.03 inch and a maximum lateral dimension of about 0.16 inch, the total area of said punch holes being no greater than the total area of non-perforated metal, the minimum distance between the edge of any hole and the edge of any adjacent hole being no less than about 0.75 times the smallest lateral dimension of the smaller of the two holes nor more than about four times the minimum lateral dimension of the larger of the two holes, the burrs produced from the punching of said holes ranging in length from about 0.03 to about 0.13 inch, and
   said opposed end portions being adapted for attachment to a motor-powered reciprocating drive means such that said burrs are fully exposed.

2. A surfacing tool in accordance with claim 1 wherein the minimum distance between the edge of any hole and the edge of said central portion is no less than 0.75 times the smallest lateral dimension of said hole.

3. A surfacing tool in accordance with claim 2 wherein said holes are substantially identical.

4. A surfacing tool in accordance with claim 3 wherein said holes are in an ordered pattern.

5. A surfacing tool in accordance with claim 4 wherein said holes are substantially circular.

6. A surfacing tool in accordance with claim 5 wherein the diameter of each of said holes is from about 0.06 to about 0.13 inch.

7. A surfacing tool in accordance with claim 6 wherein the length of each of said burrs is in the range of from about 0.06 to about 0.10 inch.

8. A surfacing tool in accordance with claim 7 wherein the axes of said holes are in lines 60° from one another.

9. A surfacing tool in accordance with claim 8 wherein said metal sheet is at least 0.01 inch in thickness.

10. A surfacing tool in accordance with claim 9 wherein said metal sheet is steel.

* * * * *